US011655933B2

(12) United States Patent
Nigam et al.

(10) Patent No.: US 11,655,933 B2
(45) Date of Patent: *May 23, 2023

(54) METHOD FOR IMPROVED INSULATION AND FILLER MATERIALS

(71) Applicant: WHIRLPOOL CORPORATION, Benton Harbor, MI (US)

(72) Inventors: Ashish Nigam, St. Joseph, MI (US); Devidas B. Raskar, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,351

(22) Filed: Dec. 14, 2021

(65) Prior Publication Data

US 2022/0099238 A1    Mar. 31, 2022

Related U.S. Application Data

(62) Division of application No. 16/758,605, filed as application No. PCT/US2017/067021 on Dec. 18, 2017, now Pat. No. 11,280,441.

(51) Int. Cl.
*F16L 59/065* (2006.01)
*F25D 23/06* (2006.01)

(52) U.S. Cl.
CPC .......... *F16L 59/065* (2013.01); *F25D 23/063* (2013.01); *F25D 23/066* (2013.01); *F25D 2201/14* (2013.01)

(58) Field of Classification Search
None
See application file for complete search history.

(56) References Cited

U.S. PATENT DOCUMENTS

| | | | |
|---|---|---|---|
| 5,952,404 A | 9/1999 | Simpson et al. |
| 6,187,256 B1 | 2/2001 | Aslan et al. |
| 6,294,595 B1 | 9/2001 | Tyagi et al. |
| 9,102,076 B2 | 8/2015 | Doshi et al. |
| 2009/0031659 A1 | 2/2009 | Kalfon |
| 2015/0190840 A1 | 7/2015 | Muto et al. |
| 2017/0157809 A1 | 6/2017 | Deka et al. |
| 2017/0182607 A1 | 6/2017 | Liu et al. |

FOREIGN PATENT DOCUMENTS

| | | |
|---|---|---|
| CN | 1886350 A | 12/2006 |
| CN | 103232170 A | 8/2013 |
| JP | 2001030397 A | 2/2001 |

*Primary Examiner* — Alexander S Thomas
(74) *Attorney, Agent, or Firm* — Price Heneveld LLP

(57) ABSTRACT

A method for preparing a vacuum insulated panel includes forming an internal cavity between a liner and a wrapper and preparing a filler material to be disposed in the internal cavity. The filler material includes a first part and a second part and is prepared by treating a surface of the first part. A coating is applied to the surface of the first part with a chemical having a first charge. The coating forms a first surface charge on the surface of the first part. The method further includes mixing the first part with the second part forming the filler material. The second part includes a material having a second surface charge opposite the first surface charge.

20 Claims, 6 Drawing Sheets

METHOD FOR IMPROVED INSULATION AND FILLER MATERIALS

CROSS-REFERENCE TO RELATED APPLICATIONS

This application is a divisional application of U.S. application Ser. No. 16/758,605 entitled METHOD AND STRUCTURE FOR IMPROVED INSULATION AND FILLER MATERIALS, filed on Apr. 23, 2020, by Ashish Nigam et al., now U.S. Pat. No. 11,280,441, the entire disclosure of which is incorporated herein by reference.

TECHNOLOGICAL FIELD

The disclosure relates to an insulation material and, more specifically, relates to a method for preparing a filler material for vacuum insulated panels and structures.

BACKGROUND

Various types of vacuum panels and other vacuum insulated structures have been developed for use in refrigerator cabinets, doors, cooking cavity, dryer systems, water heaters, freezers, insulation box and pipes systems, and other such components. Vacuum insulated structures may have superior insulation properties relative to conventional polyurethane foam insulation. However, known vacuum insulated structures and processes for fabricating such structures may suffer from various drawbacks.

SUMMARY OF THE INVENTION

In one aspect, the disclosure provides for a method for preparing a vacuum insulated panel. The method comprises forming an internal cavity between a liner and a wrapper and preparing a filler material to be disposed in the internal cavity. The filler material includes a first part and a second part and is prepared by treating a surface of the first part. A coating is applied to the surface of the first part with a chemical having a first charge. The coating forms a first surface charge on the surface of the first part. The method further includes mixing the first part with the second part forming the filler material. The second part includes a material having a second surface charge opposite the first surface charge.

In another aspect, the disclosure provides a method for preparing a vacuum insulated panel. The method includes preparing a filler material comprising a plurality of glass spheres and a fumed silica. The filler material is prepared by coating the glass spheres in a positively charged coating having a positive surface charge and mixing the glass spheres with the fumed silica. The fumed silica includes a negative surface charge. The glass spheres and the fumed silica are mixed forming a homogeneous mixture. The filler material is dispensed in an internal space compacted.

In yet another aspect, the disclosure provides for a method for preparing a panel insulated with a filler material. The method includes preparing the filler material to be disposed in a cavity for of the panel. The filler material comprises a first part and a second part. The filler material is prepared by treating a surface of the first part, wherein the treating prepares the surface to receive a coating comprising a first charge. The method further includes applying the coating to the surface of the first part forming the first charge over the surface and mixing the first part with the second part forming the filler material. The second part is of a material having a second charge opposite the first charge These and other features, advantages, and objects of the present disclosure will be further understood and appreciated by those skilled in the art by reference to the following specification, claims, and appended drawings.

BRIEF DESCRIPTION OF THE DRAWINGS

Further advantages and features according to the present disclosure will become clear from the following detailed description provided as a non-limiting example, with reference to the attached drawings in which.

Figure 1:
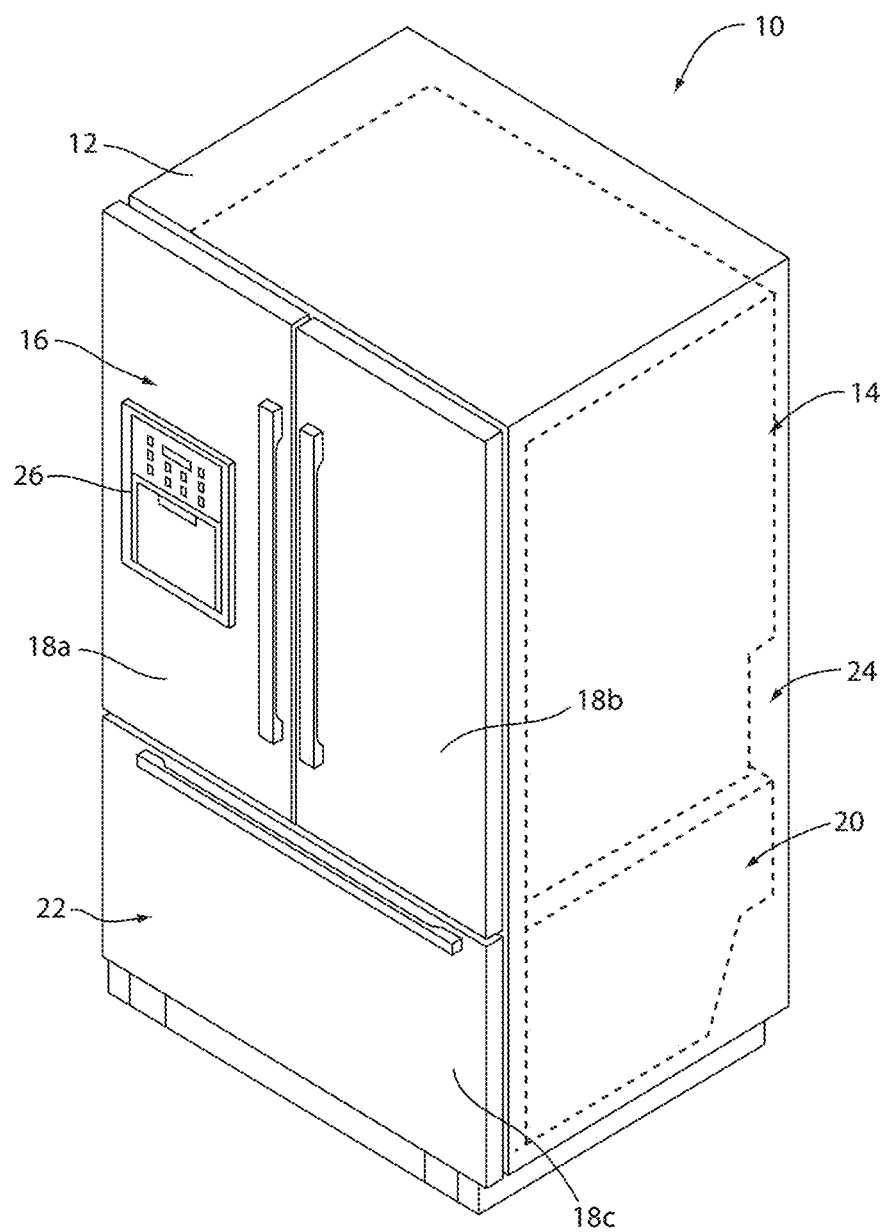
FIG. 1 is an isometric view of a refrigerator.

The components in the figures are not necessarily to scale, emphasis instead being placed upon illustrating the principles described herein.

DETAILED DESCRIPTION

The present illustrated embodiments reside primarily in combinations of method steps and apparatus components related to a materials for vacuum insulated panels. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Vacuum insulation may be utilized in a variety of applications to limit heat transfer. However, a variety of issues may arise during the processing and manufacture of vacuum insulated panels. The disclosure provides for improved methods of manufacture and construction for vacuum insulation utilizing filler materials within a vacuum cavity. In particular, the disclosure provides for a novel method for mixing glass bubbles with filler materials such that the materials uniformly mix thereby preventing inconsistent dispersion and packing of the filler materials in vacuum insulated panels. The improved methods and assemblies described herein are achieved by altering a surface charge of one or more constituent parts of the filler materials such that the parts attract each other.

In an exemplary embodiment, the disclosure provides for a method of preparing filler materials for vacuum insulation cavities by applying one or more coatings to alter the surface charge. For example, a coating may be applied to a first part of the filler material such that a surface charge of the filler material is positive or negative. The charge of the first part may be changed by the coating to have a charge that is opposite to a second part of the filler material. Accordingly, by changing the charge of one of the parts of the filler material, the method may provide for opposing surface charges on the first part and the second part to improve a mixing consistency and distribution of the constituent parts of the filler material.

In some embodiments, the first part and the second part of the filler material may comprise a similar charge prior to the application of the coating. For example, each of the parts may comprise a positive surface charge or a negative surface charge. In such circumstances, the like surface charges of the parts of the filler material may limit the mixing of the parts to a consistency achieved strictly via mechanical mixing and distribution of the materials. Conventional mixing techniques include mixing the filler materials in either dry or wet states and may result in a non-homogeneous mixing of the materials. For example, conventional mixing may achieve limited consistency and homogeneity when mixing filler materials with two or more parts that differ significantly in density and particle size. By altering the surface charge of one or more of the filler materials, the methods discussed herein may provide for improved mixing and decreased porosity.

Referring now to FIG. 1, the disclosure focuses on an example of a vacuum insulated panel utilized for a refrigerator 10. However, the vacuum insulation and associated filler materials may be implemented in a variety of applications. For example, the vacuum insulated panels may be implemented in a variety of appliances (e.g. ovens, dishwashers, water heaters, etc.) and may also be utilized to provide insulation for buildings and various facilities that may benefit from highly effective insulation. Accordingly, the disclosure may provide for insulating materials and processes that may be applied in a variety of applications.

In the exemplary embodiment shown, the refrigerator 10 comprises an insulated cabinet 12 having an upper fresh food compartment 14 that can be accessed through an access opening 16 by opening doors 18a and 18b. The insulated cabinet 12 may further comprise an insulated freezer compartment 20 that may be accessed via an opening 22 concealed by a lower door/drawer 18c. The refrigerator 10 may include a cooling system (not shown) disposed in a machine compartment 24. The cooling system may include a compressor, condenser, evaporator, and other related components that are generally known in the art. Alternatively, the cooling system may comprise one or more thermoelectric elements. An ice or water dispenser 26 may also be disposed on one or more of the doors 18.

Figure 2:
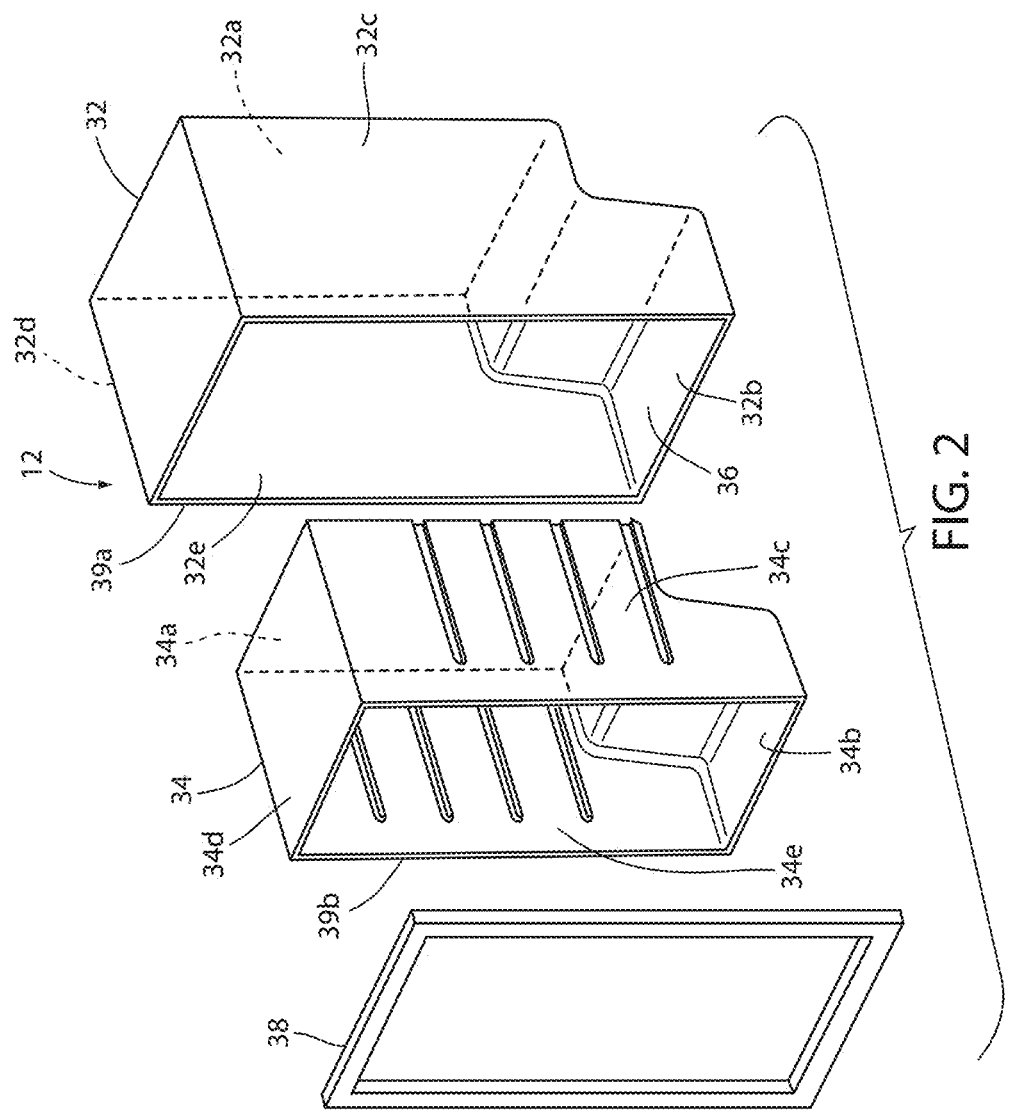
FIG. 2 is an exploded isometric view of a refrigerator cabinet.
Figure 3:
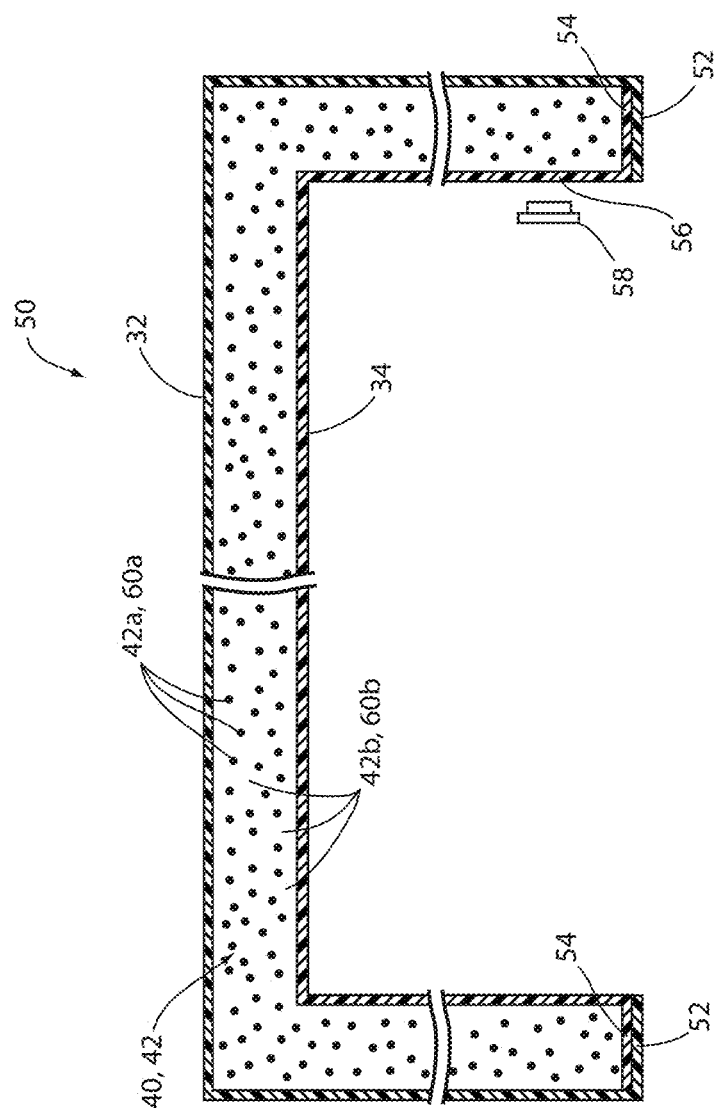
FIG. 3 is partial cross sectional view of a vacuum insulated panel.

Referring now to FIGS. 2 and 3, the insulated cabinet 12 may comprise a wrapper 32 and a liner 34. The liner 34 may be configured to fit inside an opening 22 formed by the wrapper 32 when assembled. An optional trim piece 38 may be utilized to interconnect and seal front edges 39a and 39b of the wrapper 32 and the liner 34, respectively. The wrapper 32, liner 34, and/or the trim piece 38 may be formed from a multilayer thermoplastic polymer material. The material may comprise one or more barrier layers that are substantially impervious to nitrogen, oxygen, water vapor, carbon dioxide, and other such gasses. In this configuration, a vacuum may be maintained in an internal space 40 between the wrapper 32 and the liner 34.

The internal space 40 between the wrapper 32 and the liner 34 may be filled with a filler material 42 as further discussed in reference to FIGS. 3-6. The filler material 42 may comprise a plurality of constituent parts that are mixed together to form a homogeneous mixture of at least a first part 42a and a second part 42b. The filler material 42 may form a porous filler evenly distributed throughout the internal space 40. At least one part of the constituent parts (e.g. the first part 42a, second part 42b, etc.) may be treated or processed to change a native or naturally occurring surface charge of the material in order to improve the homogeneity or distribution of the parts forming the filler material 42.

Referring still to FIG. 2 the trim piece 38 may optionally comprise a thermoset material with or without fillers or reinforcements (i.e. fibers) and may optionally include a barrier coating. The wrapper 32 and/or liner 34 may be fabricated by thermoforming a multi-layer sheet of thermoplastic polymer material, followed by a high barrier coating and at least a portion of the thermoformed material utilizing a Physical Vapor Deposition (PVD) process or a plasma polymerization coating process.

In some embodiments, one or more of the wrapper 32, the liner 34, and the trim piece 38 may optionally be made from metal or other suitable material. For example, wrapper 32 may be made from sheet metal, and the liner 34 may be made from a multi-layer thermoformed polymer material having barrier properties. The wrapper 32 may include a generally planar central sidewall portion 32a and four sidewalls 32b-32e. The four sidewalls 32b-32e may extend transversely from the central sidewall portion 32a defining the opening 22 that receives liner 34 when assembled.

Liner 34 may include a generally planar rectangular central sidewall 34a that is spaced from central sidewall 32a of wrapper 32 when assembled. The liner 34 also includes sidewalls 34b-34e that extend transversely from the central sidewall 34a. When assembled, the sidewalls 34a-34e of the liner are spaced inwardly from the sidewalls 32a-32e of the wrapper 32 to the internal space 40 therebetween. The internal space 40 may be filled with the filler material 42 and evacuated to form a vacuum.

Referring now to FIG. 3, a detailed cross-sectional view of an insulated panel 50 of the refrigerator 10 is shown. The panel 50 comprises the wrapper 32 and the liner 34. In an exemplary embodiment, the wrapper 32 and/or the liner 34 may comprise a thermoformed tri-layer polymer material or thermoformed quad-layer polymer material. In this configuration, the insulated panel 50 may provide for a vacuum insulated structure containing the filler material 42 inside the internal space 40 formed therein.

In an exemplary embodiment, the wrapper 32 may include wrapper flanges 52 that overlap liner flanges 54 of the liner 34. The flanges 52 and 54 may be interconnected to form an airtight seal. Similarly, the wrapper 32 and polymer liner 34 may be interconnected utilizing other suitable connecting structures and techniques such as welding, adhesive joining or compressed gasket fitting. The filler material 42 may be disposed in the internal space 40 and may correspond to nano or micro porous super-insulation material.

In the specific exemplary embodiment discussed herein, the filler material 42 may comprise a combination of glass bubbles 60a as the first part 42a and fumed silica 60b as the second part 42b. Though specific materials are described herein, the procedures and methods discussed herein may be applied to a variety of filler materials. For example, the filler material 42 may comprise fumed silica 60b, precipitated silica, glass microspheres, perlite, rice husk ash, ceno sphere, fly ash, etc. In the assembled form, the internal space 40 may be evacuated and sealed to define a vacuum. Further details regarding the procedures for preparing filler material 42 are discussed in reference to FIGS. 4-6.

Still referring to FIG. 3, during fabrication, the wrapper 32 and liner 34 may be assembled together and sealingly interconnected. The wrapper 32 and liner 34 may then be placed in a vacuum chamber, and the filler material 42 may be supplied into the internal space 40 through one or more openings 56. Once the filler material 42 is distributed throughout the internal space 40, the internal space 40 may be evacuated of air by the vacuum chamber. The openings 56 may then be sealed with a cap 58, and the vacuum insulated panel 50 may then be removed from the vacuum chamber.

Due to the nature of the manufacturing process, the consistent and complete distribution of the filler material 42 may be imperative to ensure that the insulated panel 50 does not collapse due to the vacuum pressure or provide inconsistent insulation. Thorough mixing of the constituent parts 42a and 42b of the filler material 42 may ensure that a homogeneous distribution is achieved. In order to ensure that such thorough mixing and consistent results, the disclosure provides for a novel approach to electrically charge one or more of the constituent parts forming the filler material 42.

Figure 4:
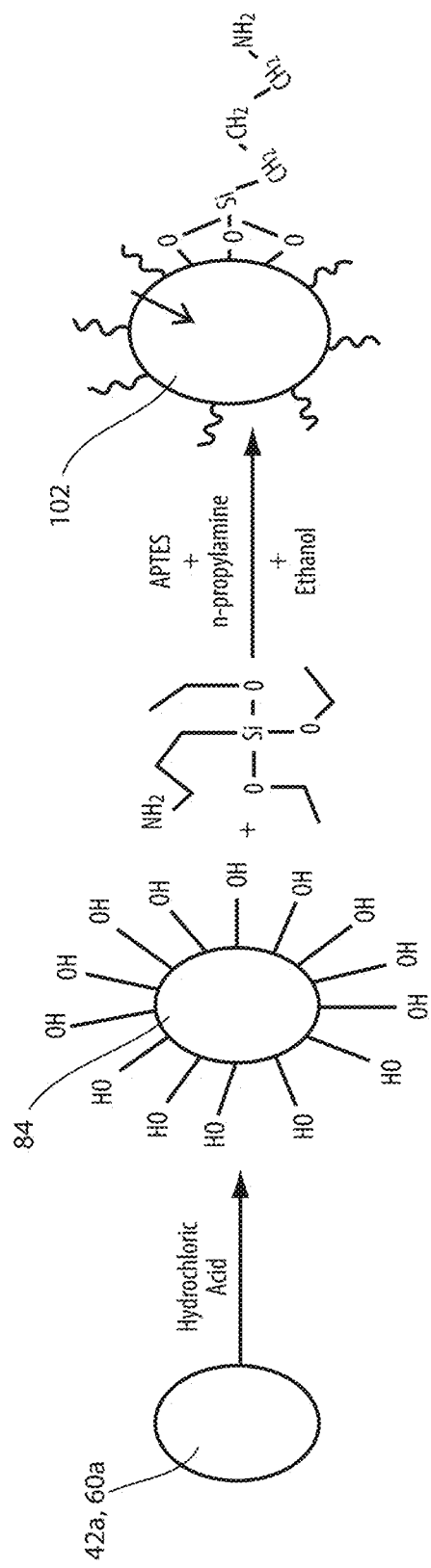
FIG. 4 is a process diagram of a method for preparing at least one part of a filler material fora vacuum insulated panel.

Referring now to FIG. 4, an exemplary process for electrically charging at least one part of the filler material 42 is shown. In the exemplary embodiment, the filler material 42 is formed as a combination of glass bubbles 60a and fumed silica 60b. As shown, the glass bubbles 60a are processed to provide a positive surface charge. In a first processing stage 62, the glass bubbles 60a are hydrolyzed using an acid or a base. The specific acid identified in the exemplary embodiment is hydrochloric acid (HCl). Hydrolyzing of the glass bubbles 60a creates a plurality of hydroxide ions positioned around the glass bubbles 60a. The hydroxide ions may provide for a surface that reacts with aminosilane (amino-propyltriethoxy silane [ARIES]) in a second processing stage 64.

After the glass bubbles 60a have been hydrolyzed in the first stage 62, the aminosilane may be applied to the hydrolyzed glass bubbles in the second processing stage 64. During the second processing stage 64, the aminosilane chemically reacts with the hydroxide ions positioned around the glass bubbles 60a. The reaction of the aminosilane with the plurality of hydroxide ions on the glass bubbles 60a produces a positively charged $NH_2$ molecule towards the end of the silane chain. The $NH_2$ compound is positively charged thus resulting in the plurality of glass bubbles 60a having a positive charge around an entirety of the glass bubbles 60a.

Referring again to FIG. 3, once the second processing stage 64 is complete, the first part 42a and the second part 42b may be mixed to form a homogeneous mixture of the filler material 42. As previously discussed, the processing of the first part 42a of the filler material 42 may result in the first part 42a and the second part 42b having opposite electrical surface charged. In the exemplary embodiment, the first processing stage 62 and the second processing stage 64 provide for the first part 42a to have a positive surface charge while the second part 42b has a negative surface charge. The opposing charges of the first part 42a and the second part 42b of the filler material 42 may provide for improved mixing such that the filler material 42 results in a homogeneous mixture of the first part 42a and the second part 42b.

The mixing process may be completed with conventional augers or various mixing equipment. In the exemplary embodiment, during the mixing, the positively charged plurality of glass bubbles 60a and the negatively charged fumed silica 60b may be mixed. The positive charge of the glass bubbles 60a attracts the negative charge of the fumed silica 60b. The mixture of glass bubbles 60a and filler materials may then be inserted in the internal space 40 between wrapper 32 and the liner 34 of the panel 50.

Figure 5:
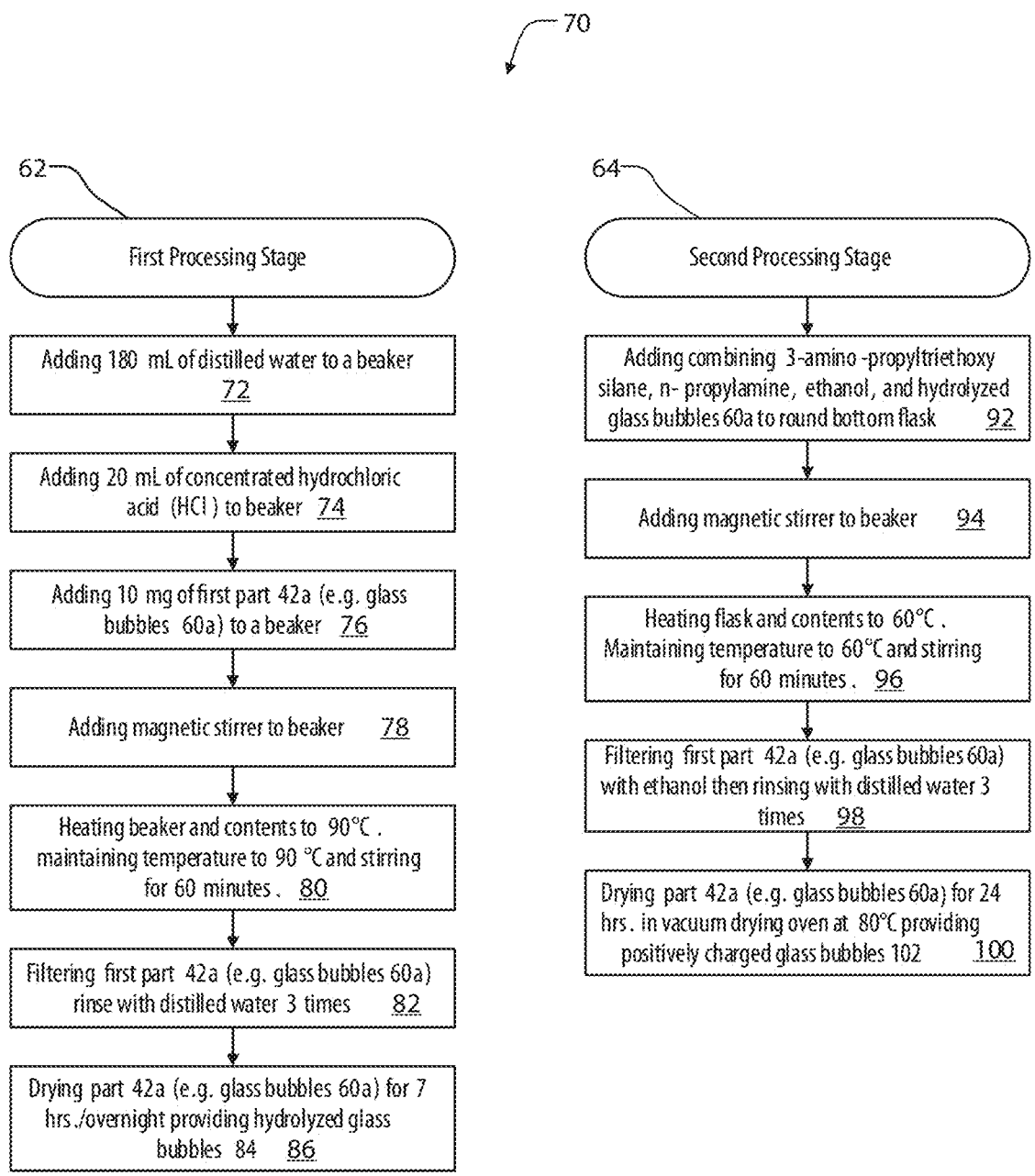
FIG. 5 is a flowchart demonstrating a method for preparing a filler material for a vacuum insulated panel.

Referring now to FIG. 5, a flowchart describing an experimental procedure or method 70 for preparing the first part 42a of the filler material 42 is described in detail. The specific steps discussed in the experimental procedure are provided for clarity and may be scaled or adapted to suit a variety of manufacturing processes. Accordingly, the specific steps discussed herein shall not be considered limiting to the disclosure, and the procedures may be adapted in a variety of ways that may be understood by those having skill in the art without departing from the spirit of the disclosure.

As discussed in reference to FIG. 4, the processing steps for preparing the first part 42a of the filler material 42 may comprise a first processing stage 62 and a second processing stage 64. The first processing stage 62 may begin by adding 180 ml of distilled water to a beaker (72). The quantity of each of the ingredients may vary depending on the specific application for the filler material 42, however, exemplary values are included for clarity. Along with the distilled water, 20 ml of concentrated hydrochloric acid and 10 mg of the glass bubbles 60a may also be added in steps 74 and 76. Additionally a magnetic stirrer may be added to the beaker (78).

Once combined in the beaker, the method 70 may continue by heating the contents of the beaker to 90° C. and maintaining the temperature at 90° C. for 60 minutes (80). After the time has elapsed, the glass bubbles 60a may be filtered from the solution and rinsed a plurality of times (e.g. 3 times) with distilled water (82). The filtered glass bubbles 60a may then be dried for 7 hours or overnight providing hydrolyzed glass bubbles 84 (86). The hydrolyzed glass bubbles 84 may have a surface coating of hydroxide molecules configured to provide for the reaction necessary to positively charge the glass bubbles 60a in the second processing stage 64.

The second processing stage 64 may begin by combining 3-amino-propyltriethoxy silane, n-propylamine, ethanol, and the hydrolyzed glass bubbles 84 in round bottom flask (92). In a first sample, the quantities of the ingredients tested were 3 ml 3-amino-propyltriethoxy silane, 0.6 ml n-propylamine and 296.4 ml Ethanol. In a second sample, the quantities of the ingredients were 15 ml 3-amino-propyltriethoxy silane, 0.6 ml n-propylamine and 284.4 ml Ethanol. The second sample included a higher quantity of the 3-amino-propyltriethoxy silane. However, each of the samples provided beneficial results, which were confirmed through testing to be related to the charging of the first part 42*a* or the glass bubbles 60*a*.

Once combined in the beaker, method 70 may continue by adding a magnetic stirrer to the beaker (94). The contents of the flask may then be heated to 60° C. and the temperature may be maintained for 60 minutes (96). After the time has elapsed, the glass bubbles 60*a* may be filtered from the solution with ethanol and then rinsed a plurality of times (e.g. 3 times) with distilled water (98). The glass bubbles 60*a* may then be dried for 24 hours providing the positively charged glass bubbles 102 (100). The positively charged glass bubbles 102 may have a surface coating comprising positively charged $NH_2$ group linked toward the end of the silane chain. The $NH_2$ group may be positively charged resulting in the plurality of glass bubbles 60*a* having the positive effective charge resulting in the positively charged glass bubbles 102.

Once the first part 42*a* (e.g. the glass bubbles 60*a*) is processed providing for the positively charged glass bubbles 102, the first part 42*a* and second part 42*b* of the filler material 42 may be mixed together. The mixing process may be completed with conventional augers or various mixing equipment. In the exemplary embodiment, during the mixing, the positively charged plurality of glass bubbles 60*a* and the negatively charged fumed silica 60*b* may be mixed. The positive charge of the glass bubbles 60*a* attracts the negative charge of the fumed silica 60*b*. The mixture of glass bubbles 60*a* and filler materials may then be inserted in the internal space 40 between wrapper 32 and the liner 34 of the panel 50.

Figure 6:
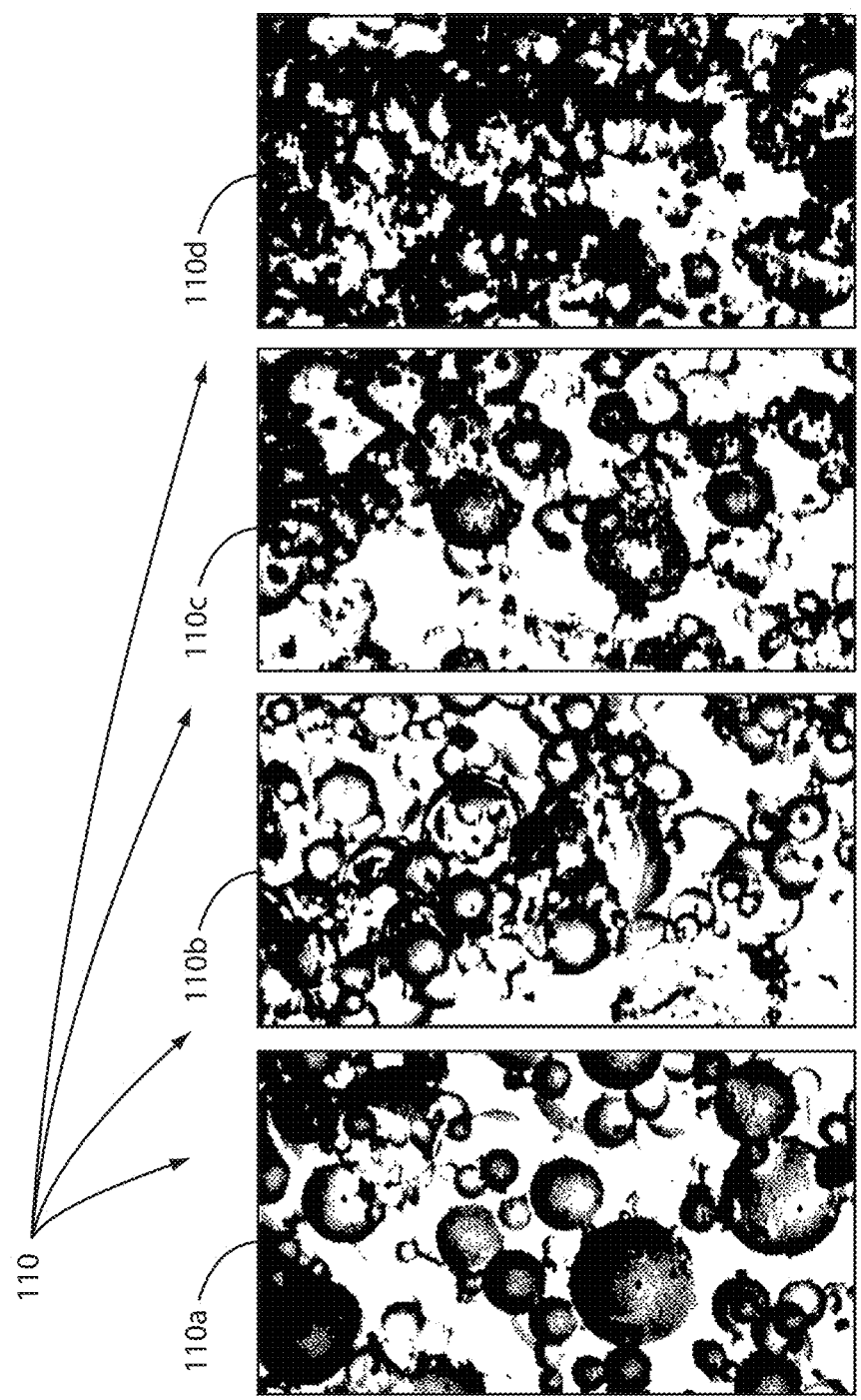
FIG. 6 is a plurality of images demonstrating an improved packing and decrease in porosity provided by disclosed filler material in accordance with the disclosure.

Referring to FIG. 6, images of a plurality of samples 110 of the filler material 42 are shown. The first sample 110*a* comprises glass bubbles 60*a* without a silane coating and fumed silica 60*b* mixed together. Each of the second sample 110*b*, third sample 110*c* and the fourth sample 110*d* comprise a 5% silane coating. The samples 110*b*, 110*c*, and 110*d* were processed by a method similar to that discussed in reference to FIG. 5. The first sample 110*a* and the second sample 110*b* comprises a 10% fumed silica 60*b* and glass bubble 60*a* mixture. The third sample 110*c* comprises a 20% fumed silica 60*b* and glass bubble 60*a* mixture, and the fourth sample 110*d* comprises a 50% fumed silica 60*b* and glass bubble 60*a* mixture.

Upon inspection, the less dense particles of fumed silica 60*b* are mixed more consistently with the larger and more dense, positively charged glass bubbles 102 in the second sample 110*b*, third sample 110*c* and the fourth sample 110*d*. The improved mixing further provides for improved packing and decreased porosity of the filler material 42 in vacuum compression. Accordingly, the opposing surface charges of the first part 42*a* and the second part 42*b* of the filler material 42 provide for increased packing and decreased porosity of the filler material 42 in the insulated panel 50 of the refrigerator 10 or various other devices or structures that may benefit from improved insulation.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A method for preparing a vacuum insulated panel comprising:
    forming an internal cavity between a liner and a wrapper; and
    preparing filler material to be disposed in the internal cavity, wherein the filler material comprises a first part and a second part, and preparing the filler material comprises:
        coating a surface of the first part with a chemical comprising a first charge, wherein the coating forms a first surface charge on the surface of the first part; and mixing the first part with the second part forming the filler material, wherein the second part comprises a material having a second surface charge opposite the first surface charge.

2. The method according to claim 1, further comprising: treating a surface of the first part, wherein the treating prepares the surface to receive the coating comprising the first charge.

3. The method according to claim 1, further comprising: feeding the filler material into the internal cavity; and evacuating air from the internal cavity, compacting the liner and wrapper to the filler material.

4. The method according to claim 1, wherein the first surface charge is positive and the second surface charge is negative.

5. The method according to claim 1, wherein the first charge comprises a positive charge and the treating of the first part by preparing the surface to receive the coating comprises soaking the first part in an acid.

6. The method according to claim 5, wherein the acid is hydrochloric acid and the treating hydrolyzes the surface of the first part.

7. The method according to claim 1, further comprising: rinsing and drying the first part after the treating and before coating the surface.

8. The method according to claim 1, wherein the first part is a plurality of glass bubbles.

9. The method according to claim 1, wherein the second part is a fumed silica.

10. The method according to claim 1, wherein the chemical comprising the first charge is a silane.

11. A method for preparing a vacuum insulated panel comprising:
preparing a filler material comprising a plurality of glass spheres and a fumed silica by:
coating the glass spheres in a positively charged coating having a positive surface charge; and
mixing the glass spheres with the fumed silica, wherein the fumed silica comprises a negative surface charge, wherein the glass spheres and the fumed silica are mixed forming a homogeneous mixture;
dispensing the filler material in an internal space; and
compacting the filler material within the internal space.

12. The method according to claim 11, further comprising:
providing a liner forming an interior wall of a refrigerator compartment.

13. The method according to claim 11, further comprising:
providing a wrapper configured to enclose an exterior wall of the liner, opposite the interior wall.

14. The method according to claim 11, further comprising:
connecting the liner and the wrapper together forming the internal space.

15. The method according to claim 11, wherein the internal space is evacuated thereby compacting the filler material.

16. The method according to claim 11, wherein coating the glass spheres comprises applying a silane material having a positive charge to the surface of the glass spheres.

17. The method according to claim 16, further comprising:
hydrolyzing the glass spheres in an acid bath, providing for a bond between a hydroxide and the silane material.

18. A method for preparing a panel insulated with a filler material comprising:
preparing the filler material to be disposed in a cavity of the panel, wherein the filler material comprises a first part and a second part, and preparing the filler material comprises:
treating a surface of the first part, wherein the treating prepares the surface to receive a coating comprising a first charge;
applying the coating to the surface of the first part forming the first charge over the surface; and
mixing the first part with the second part forming the filler material, wherein the second part comprises a material having a second charge opposite the first charge.

19. The method according to claim 18, further comprising:
providing the panel forming the cavity;
feeding the filler material into the cavity; and
compacting the filler material within the cavity.

20. The method according to claim 19, wherein compacting the filler material comprises evacuating air from the cavity.

* * * * *